Jan. 8, 1929.  
L. T. WOOD  
1,698,522  
UNIVERSAL TILTING VEHICLE BODY  
Filed March 14, 1927   4 Sheets-Sheet 2

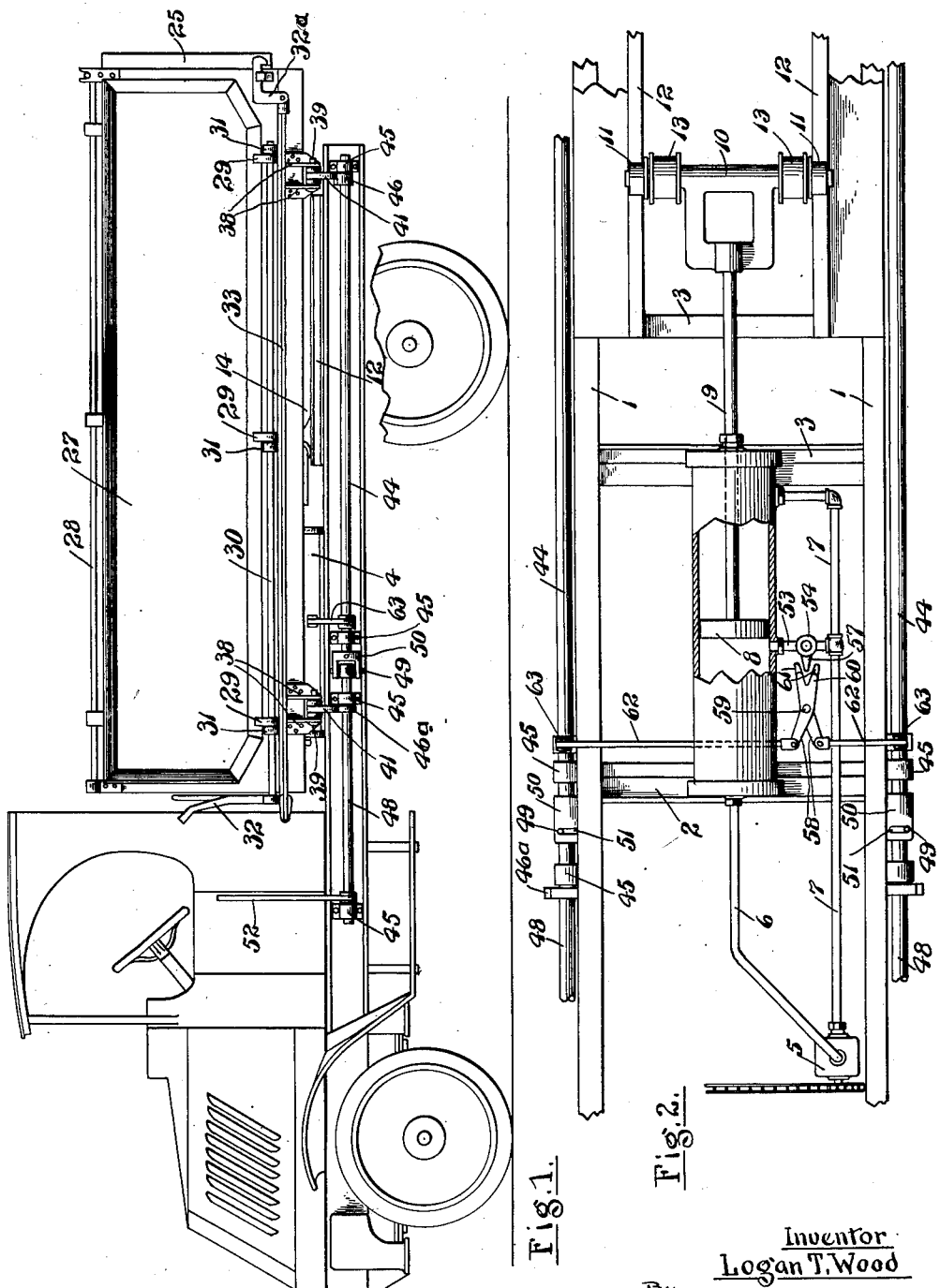

Inventor  
Logan T. Wood  
By Frank E. Liniane  
Attorney

Jan. 8, 1929.

L. T. WOOD 1,698,522

UNIVERSAL TILTING VEHICLE BODY

Filed March 14, 1927     4 Sheets-Sheet 3

Inventor
Logan T. Wood
By
Frank E. Livernash Jr.
Attorney

Jan. 8, 1929.

L. T. WOOD 1,698,522

UNIVERSAL TILTING VEHICLE BODY

Filed March 14, 1927

Inventor
Logan T. Wood
By Frank E. Liverance, Jr.
Attorney.

Patented Jan. 8, 1929.

1,698,522

UNITED STATES PATENT OFFICE.

LOGAN T. WOOD, OF DETROIT, MICHIGAN.

UNIVERSAL TILTING-VEHICLE BODY.

Application filed March 14, 1927, Serial No. 175,117, and in Great Britain and France November 2, 1926.

This invention relates to a body dumping mechanism used for dumping the contents of bodies carried usually on motor vehicles. It is a primary object and purpose of the present invention to proide a body dumping mechanism whereby, by use of the same power unit, a body may be tilted either upwardly about a horizontal axis and the contents dumped at the rear end of the body, or either to one side or the other about other horizontal axes located along each side of and parallel to the length of the vehicle chassis. The invention has for a further object and purpose the provision of simple means for rendering any one of the three dumping actions effective by selective controls therefor which are within easy reach of the driver of the vehicle. The invention consists in the provision of many novel details of construction and novel organization and arrangements of parts for practically and effectively attaining the ends stated.

For an understanding of the invention reference may be had to the following description taken in connection with the accompanying drawings, in which, Fig. 1 is a side elevation of a truck having my invention applied thereto.

Fig. 2 is a fragmentary plan view of the chassis with parts of the dumping apparatus and controls therefor shown.

Like reference characters refer to like parts in the different figures of the drawing.

Figure 3:
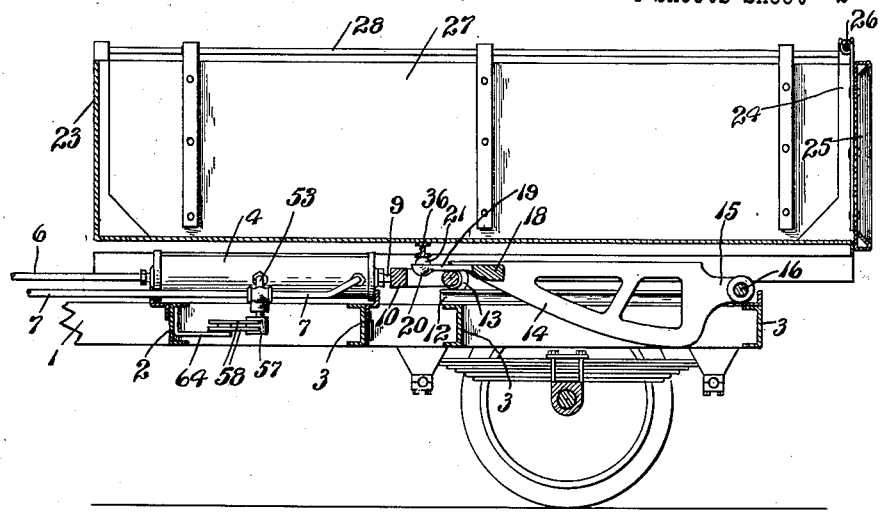
Fig. 3 is a fragmentary longitudinal vertical section through the rear portion of the truck and the body mounted thereon, the body being in normal horizontal position.
Figure 4:
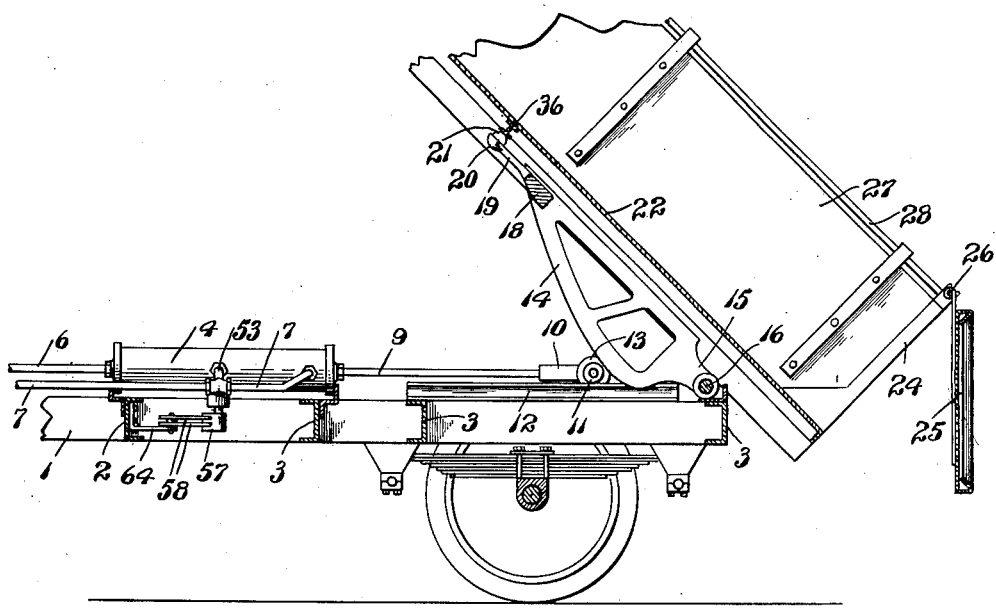
Fig. 4 is a similar view illustrating the body tilted upwardly about a rear horizontal axis so as to dump its contents at the rear of the vehicle.
Figure 5:
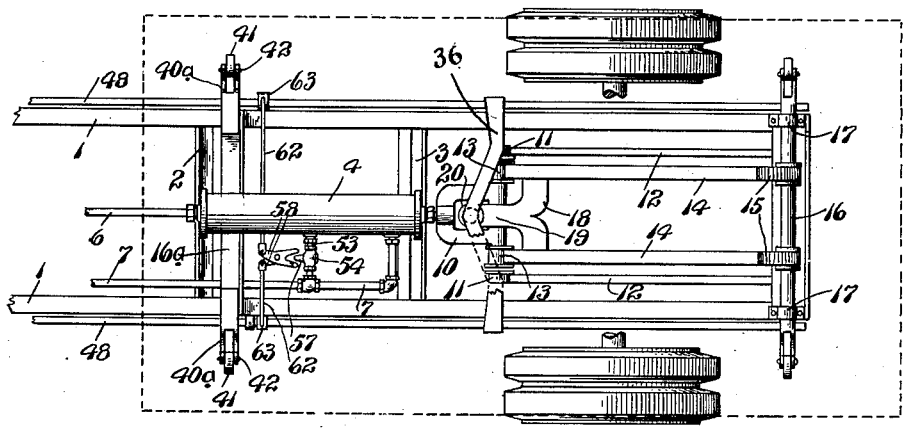
Fig. 5 is a fragmentary plan of the construction shown in Fig. 3 with the body removed.
Figure 6:
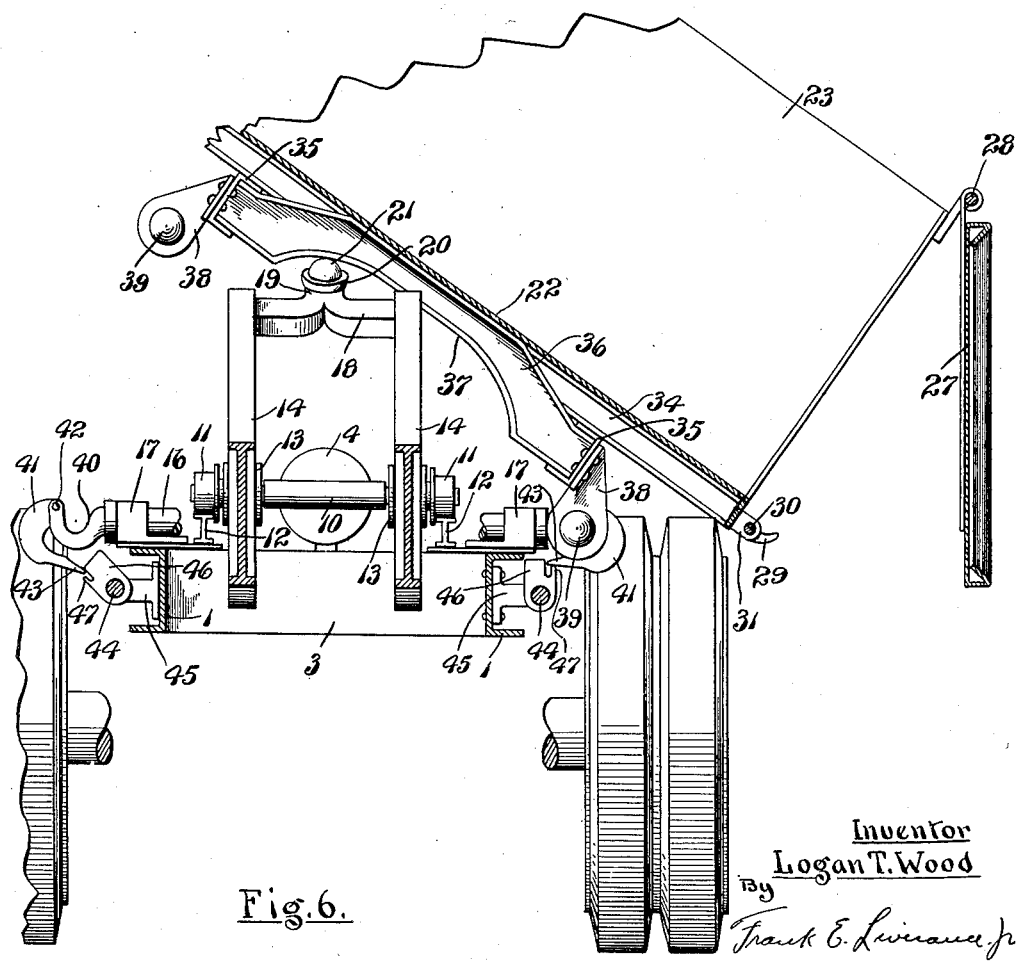
Fig. 6 is a fragmentary enlarged transverse vertical section illustrating the side dumping operation.

The motor vehicle chassis frame is of usual construction having spaced apart chassis side frame members 1 which are connected and strengthened by the usual cross members 2 and 3. A hydraulic cylinder 4 is located horizontally above and carried by two of the cross members 2 and 3, as shown in Figs. 2, 3 and 4, and oil or like liquid is pumped into the front end of said cylinder by a gear pump 5 through a pipe 6, the return of the oil to the pump from the opposite end of the cylinder being through a return pipe 7. A piston 8 is located within the cylinder and has a piston rod 9 extending therefrom through the rear end of the cylinder. At the rear end of the piston rod 9 a cross head 10 is secured, at each end of which a roller 11 is mounted. The two rollers 11 move back and forth on horizontal tracks 12 which are mounted in spaced apart relation on the vehicle frame. The cross head 10 also carries two flanged rollers 13 set in a short distance from the rollers 11 which bear against the under side of two spaced apart cam members 14 provided with extensions 15 at their rear ends pivotally mounted on a cross rod 16, carried by the chassis frame in suitable bearings 17 as shown in Figs. 5 and 6.

The cam members 14 are connected at their front ends by a cross bar 18 which, substantially at its middle, has a forwardly extending arm 19, the front end of which is fashioned into a cup 20 in which a ball 21 is seated. The purpose of this will later appear.

The body which is carried by the truck includes a bottom 22, a front end 23, two vertical rear corner posts 24 between which a tail gate 25 may be located to close the rear end of the body, said tail gate being mounted for pivotal movement at its upper end about a rod 26 extending between the upper ends of the posts. The body also includes two sides 27 which likewise are mounted for swinging movement on rods 28 extending between the upper ends of the rear posts 24 and the front end 23 of the body.

The sides 27 are held against outward swinging movement by latch fingers 29, a number of which are mounted on rock shafts 30, one at each side of and at the lower corners of the body. These shafts extend to the front end of the body and at their front ends are equipped with upwardly extending handles 32 which may be operated to rock the shafts so as to move the fingers 29 to either retaining or releasing position. In practice the handles 32 are normally held in vertical position by any conventional latch device so that the sides 27 are securely held against outward swinging movement by the retaining fingers 29. The tail gate is equipped with the usual latching device 32$^a$ (see Fig. 1) which may be operated through the medium of a rod 33 extending to the front of the body which in turn may be moved lengthwise by any suitable lever. This latching means for the tail gate is old and well known and forms no novel feature of the present invention.

On the under side of the body a plurality of cross sills 34 are secured which are connected to two spaced apart channel bars 35 located parallel the chassis side frame members 1, which, in the horizontal position of the body, lie short distances out from the planes of said chassis frame members. A cam rail 36, having an under cam surface 37, lies underneath and transversely of the body between the channels 35 directly over the ball 21 so that said ball bears against the cam lower surface 37.

Adjacent both the front and rear ends of the body and at each side thereof, two brackets 38 are connected to the channels 35 depending therefrom. Between each pair of brackets a pin 39 is disposed. The pins for the rear pairs of brackets are received in sockets 40 which may conveniently be made at the ends of the shaft 16. The pins 39 for the front pairs of brackets are normally seated in similar sockets 40$^a$ made in members which are attached permanently to a cross member 16$^a$ which may be of angle iron or other equivalent form. The sockets 40 and 40$^a$ open upwardly and are of a shallow U-shape. When the pins 39 are all seated in the sockets 40 and 40$^a$ the body is supported at four corners and held against aimless movement.

On the outer leg of each of the socket members 40 and 40$^a$ a latch 41 is pivotally mounted at 42. The latch is of the form shown in Figs. 11 to 14 inclusive and at its free end terminates in a downwardly and inwardly extending tail piece 43. The latch is of such form that when turned in a clockwise direction a portion of it, at the end where it is pivoted to a socket member 40 or 40$^a$, extends partly over the pin 39 seated in said socket member and locks the pin against upward movement so that when all of the latches 41 are in locking position the body is securely locked to the frame of the vehicle.

At the outer side of each of the vehicle frame members 1 a horizontal shaft 44 is mounted in brackets 45 permanently connected to the webs of the frame members 1. Adjacent the rear end of each shaft 44 a releasing dog 46 is permanently secured which is of the form shown in Figs. 13 and 14, at its outer side having an upwardly extending finger 47 spaced a short distance from the body of the member 46. When the shaft is in one position (see Fig. 13) with the releasing dog 46 in vertical position the finger 47 comes under the tail piece 43 of its associated latch 41 and moves the latch so that it locks and holds the rear pin 39 with which it is associated against upward movement. But when the shaft is turned so as to move the latching dog to the position shown in Fig. 14 the latch 41 is moved outwardly so as to release the pin 39.

The shafts 44 extend forward to a point somewhat forward of the middle of the cylinder 4. In front of each shaft 44 and in direct alignment therewith, is a second shaft 48 likewise mounted by means of brackets 45 on the chassis frame members 1. This shaft is also provided with a releasing dog 46$^a$ having the same finger 47 thereon, the only difference between the members 46 and 46$^a$ being that the sides of the member 46 are parallel to each other while the sides of the member 46$^a$ diverge upwardly whereby member 46$^a$ is considerably widened at its upper side, and its upper edge is curved in the arc of a circle, the center of which is the axis of the shaft 48 on which it is mounted.

Figure 10:
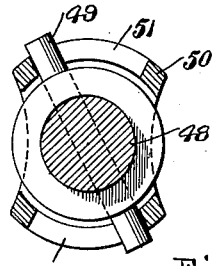
Fig. 10 is a fragmentary enlarged vertical transverse section through a detail of the construction having to do with the control apparatus.
Figure 11:
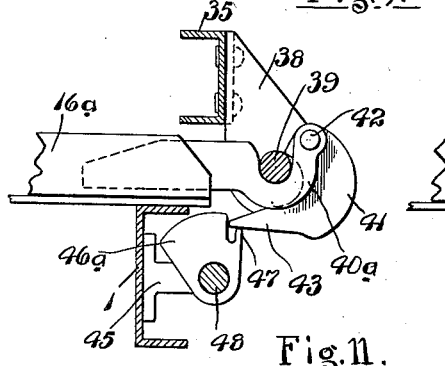
Fig. 11 is a fragmentary enlarged vertical section illustrating the mechanism used for locking the front end of the body down on the chassis frame.

The shaft 48 and shaft 44 at each side of the machine are connected at their adjacent ends. The rear end of the shaft 48 is provided with a pin 49 which passes through the shaft, each end thereof extending a distance beyond the shaft. The front end of shaft 44 is equipped with a fork 50 having two fingers, in each of which a slot 51 is cut, the ends of the pin 49 extending into the slots 51 (see Fig. 10). Each shaft 48, near its front end, is provided with an operating lever 52 which extends upward alongside the cab of the vehicle so as to be within easy reach of the driver. When the lever 52 at either side of the machine is moved outwardly the first movements results only in turning the shaft 48 connected therewith, the ends of pin 49 traversing the slots 51. Accordingly, during this first part of the movement a shaft 48 turns but its connected shaft 44 remains stationary. This results in turning the member 46$^a$ and moving the latch 41, associated with a front pin 39 to inoperative position, as shown in full lines in Fig. 12. But the members 46 on the rear shafts 44 remain in the position shown in Fig. 13. When the body is to be tilted upwardly about rod 16 both of the levers 52, one at each side of the car, are moved outwardly so as to turn the shafts 48 alone and unlock the front end of the body so that it may move upwardly. But the rear end of the body remains locked in the sockets 40 at the ends of the rod 16.

Figure 12:
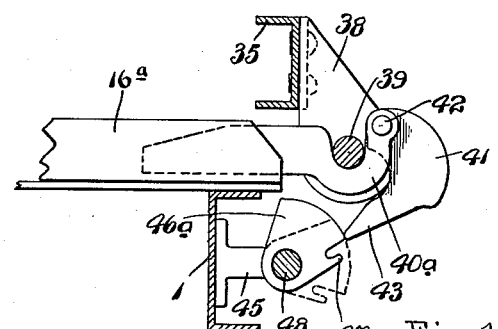
Fig. 12 is a similar section showing the same unlocked and the position of the mechanism which performs the unlocking operation.
Figure 13:
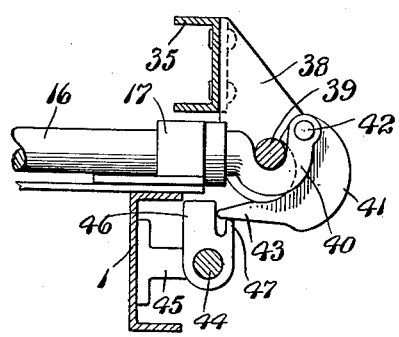
Figs. 13 and 14 are views similar to Figs. 11 and 12, respectively, showing like apparatus in locked and unlocked positions for the rear end of the body.
Figure 14:
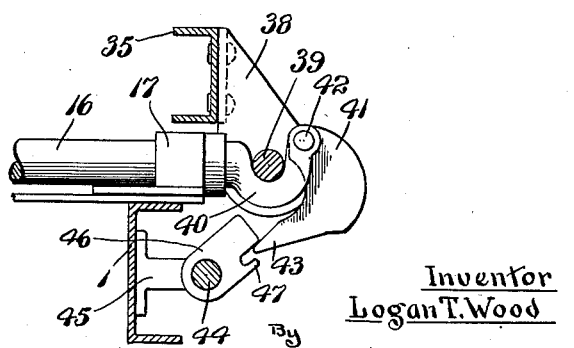

A continued movement of a lever 52 in an outward direction after the ends of pin 49 have reached the ends of the slots 51, results in further turning the shaft 48 and a turning of the shaft 44 connected thereto with a movement of both members 46ª and 46, the one from the full line position shown in Fig. 12 to the dotted line position, and the other from the position shown in Fig. 13 to that shown in Fig. 14. When there is to be a side dumping of the body the lever 52 on the side of the vehicle opposite to the side at which the dumping is to take place, is moved outwardly so as to unlock both of the pins 39 at that side of the body whereby the body may be tilted about the axis of the remaining pins 39 at the opposite side of the body which are still locked in their sockets 40 and 40ª. The continued movement of the releasing dog 46ª from the full line position shown in Fig. 12 to the dotted line position, does not affect the position of the latch 41 associated with it, but merely holds it in its unlatched position.

The tilting about the axis of the rod 16 is accomplished by merely pumping oil into the front end of the cylinder 4 through the pipe 6 with a consequent rearward movement of the cross head 10 and an elevation of the cam members 14 and of the body. The oil back of the piston 8 comes to the pump 5 through the pipe 7. The front pins 39 are unlocked by moving both levers 52 outward to their intermediate position and the body tilts upwardly in substantially the same way as shown in my Patent No. 1,502,534, granted July 22, 1924.

Figure 7:
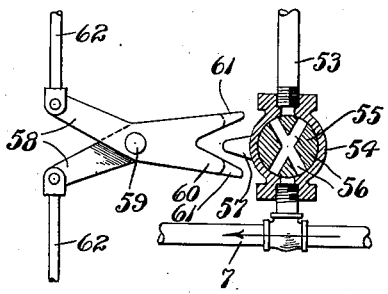
Figs. 7, 8 and 9 are fragmentary plans partly in section showing the positions of the control valve for different dumping operations of the body and the positions of the control devices which operate said valve in said different positions.

For the side dumping of the body a by-pass for carrying the oil which is used to move the piston longitudinally of the cylinder is provided between a side of the cylinder and the return pipe 7. This bypass consists of a pipe 53 connected with the cylinder 4 approximately midway between its ends at one end and at the other end connected with the return pipe 7. In the pipe 53 a valve casing 54 is interposed in which a valve 55 is mounted, the same having two passages 56 therethrough, said passages crossing each other, and below the casing 54 having a forwardly extending operating finger 57 which may be operated to turn the valve to different positions. During the rear dumping operation of the body the valve occupies a neutral position such as shown in Fig. 7, neither of the passages 56 being in alignment with the pipe 53 and the connection to the pipe 7. Therefore the oil pumped by the pump 5 into the cylinder 6 moves the piston 8 to the rear until such time as it passes by the rear end of the return pipe 7. When this occurs continued further operation of the pump 5 merely circulates the oil through the cylinder and the pipes 6 and 7 without forcing the piston 8 farther back. If, however, the valve 55 is moved to either of the two positions, shown in Figs. 8 and 9 the piston can be moved only to the position shown in Fig. 2. Thereafter the oil will circulate from the pump 5 through pipe 6 to the cylinder, thence through the by-pass pipe 53 and through the valve 55 to the return pipe 7 and to the pump. This is necessary for the reason that in the side dumping operation the cross head 10 should not be moved as far back as in the rear damping operation. For if it was permitted to go the full distance is would result in damage to the apparatus, the body or the truck.

Figure 8:
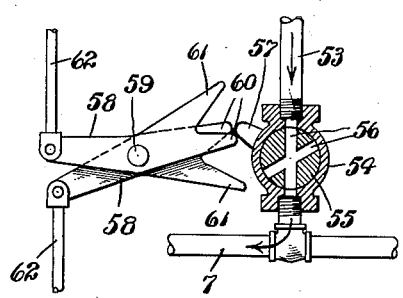
Figure 9:
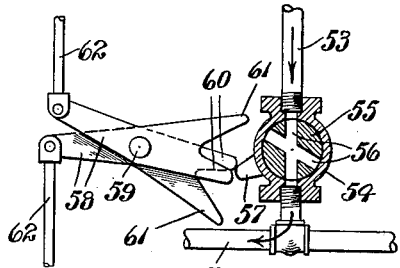

I have provided a means for automatically turning the valve 55 to either the positions shown in Figs. 8 or 9 whenever side dumping is to occur and the proper lever 52 is operated to unlatch two of the pins 39 at the side of the body which is to be elevated during the side dumping operation. To effect this, two trip members 58 located one over the other and pivotally connected together between their ends at 59 are mounted in front of the finger 57, each of said members at its rear end being provided with an angle recess so as to make two spaced apart fingers 60 and 61, one of which lies in each side of the valve operating finger 57. A rod 62 is secured to the front end of each of the members 58 and extends therefrom outward, one toward each of the shafts 48, being connected at their outer ends to vertical arms 63 which are fixed, one to each of the shafts 44. The members 58 are conveniently mounted on a bracket 64 (see Figs. 3 and 4) which in turn is mounted on the cross member 2 of the chassis frame. The operation of this construction when a lever 52 is moved outwardly to its extreme, and the shaft 44, as well as the shaft 48 at that side of the vehicle, is turned, is not only to release two of the pins 39 at the side of the vehicle where the lever 53 operated is mounted, but it also swings the connected arm 63 outwardly, thereby moving the rod 62 attached thereto, longitudinally outward, with a consequent turning of the member 58 attached thereto about the axis of the pin 59. When the lever 52, at one side of the machine is thus operated the movement of the member 58, as shown in Fig. 8, causes its finger 60 to engage with the valve finger 57 and turn it to a position such that the by-pass is opened. When the lever 52 on the other side is similarly operated the same effect occurs though the valve finger 57 is turned in the opposite direction as shown in Fig. 9, but the by-pass is fully opened the same as shown in Fig. 8. Accordingly, irrespective of which lever or handle 52 at either side of the vehicle is operated to its extreme outward position, the bypass 53 is open so as to permit circulation of oil through it and limit the extent of rearward movement of the piston 8 in the cylinder 4. When either lever 52 is moved back to normal position the opposite finger 61 on the member 28 operated, engages with the valve finger 27 and turns it to the neutral position shown in Fig. 7.

With the pins 39 at one side of the body released and with the by-pass open as an automatic consequence of operation of the mechanism described and operated when said pins are released, the rearward movement of the cross head 10 elevates the cam members 14 which in turn, acting against the lower side 37 of the cam rail 36, tilt the body about the axis of the two pins 39 which remain locked to the chassis frame. When the piston 8 passes by the end of the by-pass pipe 53, further elevation stops. This is at the point beyond which it is not desired to further tilt the body. The pins 39 at either side of the body may be released while those at the opposite side remain locked so that a discharge of the contents of the body may be had at either side of the vehicle. Of course, the release of the proper side 27 of the body to permit dumping is controlled by the driver of the machine through operation of the proper lever 52.

This construction is practical and effective and one which attains all the results of my former patent heretofore mentioned so far as dumping the contents of a truck body at the rear is concerned, together with an ability to dump the contents of the body at either side of the vehicle when it may be desired. There are many instances when this is desirable particularly where there is not room enough to allow for rear dumping. The construction has proved exceptionally practical and efficient in service. The invention is defined in the appended claims and is to be considered comprehensive of all forms of structure coming within their scope.

I claim:

1. In combination, a truck frame, a transverse shaft rotatably mounted on said frame near the rear end thereof, U-shaped sockets, one at each end of the shaft, other sockets attached, one at each side of the frame in front of said shaft, a body, a pair of brackets connected with the body adjacent each socket, pins disposed between the brackets of each pair of brackets and seated in said sockets, cam members mounted on said shaft and extending forward therefrom, a transverse cam rail secured to the under side of the body, a cross bar connecting the front ends of said cam members, anti-friction means carried by said cross member bearing against the under side of the cam rail, and hydraulic means for elevating said cam members.

2. In combination, a truck frame, a body mounted above the frame, means for mounting said body on the frame for tilting movements about three axes, one located transversely of and at the rear of said frame and the others located, one at each side of and parallel to the length of said frame, cam members pivotally mounted at their rear ends to turn about said transverse axis, a cam rail secured at the under side of and transversely of the body over the front portions of said cam members, anti-friction means interposed between the cam members and the lower side of said cam rail, and hydraulic means for elevating said cam members and turning the same about said rear transverse axis.

3. A construction containing the elements in combination defined in claim 2, combined with releasable latching means for locking the body to said frame at four points, one adjacent each corner of said body, combined with means for releasing said locking engagement with the body at its front corners whereby the body may be tilted upwardly about its rear transverse axis.

4. A construction containing the elements in combination defined in claim 2, combined with means for releasably locking the body to said truck frame at four points, one adjacent each corner of the body, and means for unlocking the connection of the body to the frame at both the front and rear corners at either side of the frame whereby the body may be tilted to dump its contents at either side.

5. In combination, a truck frame, a body mounted above said truck frame, a horizontal shaft located adjacent the rear end and transversely of said frame, a pair of spaced apart cam members connected at their rear ends to said shaft and extending forward under said body, a cross bar connecting the front ends of the cam members, said cross bar at its middle having a forwardly projecting arm, a cup at the upper side of said arm, a ball seated in said cup, a transverse rail having a cammed underside secured to the underside of the body with the ball bearing against the cam underside of said rail, hydraulic means for elevating said cam members, and means for selectively locking the body to the frame at its front at each side, and to the shaft at its rear end at each side whereby the body may be locked to said shaft at its rear end and unlocked from the frame at its front end for tilting the body about the shaft, or may be locked at its rear end to one end of the shaft and at its front end to the body at the same side of the frame whereby the body may be tilted for a side dumping of its contents.

6. In combination, a truck frame, a body located above the truck frame, a horizontal shaft mounted transversely and at the rear end of the frame, a U-shaped socket open at its upper side at each end of the shaft, other sockets one at each side of and connected to the frame adjacent the front end of the body, bearing pins on the body seating one in each socket, latch members pivotally connected to the sockets and movable to extend partly over said pins and lock the same in said sockets, a shaft mounted alongside each side of the frame, a second shaft located in front of the first shaft, means connecting the ends of the first and second shafts whereby the first shaft may be rotated a predetermined distance before the second shaft is started to rotate, members on the first shaft operatively engaging with the latches on said rear sockets to move the same to unlatched position and similar members on said second shafts operatively engaging the latches on the front sockets to move the same to inoperative position on rotation of said front shafts, manually operated means for turning the front shafts, and hydraulic means for tilting the body.

7. In combination, a truck frame, a body tiltably mounted on said truck frame to turn about a rear transverse horizontal axis or either one of two horizontal axes located, one at each side of and parallel to the frame, a horizontal cylinder, a piston in the cylinder, a piston rod extending to the rear from the cylinder, means on the rear end of the piston rod and means associated with the body for tilting the body about a selected axis on rearward movement of said piston rod, means for forcing liquid into the cylinder at its front end, a pipe for returning liquid from the rear end of the cylinder, a by-pass pipe connecting said return pipe and the cylinder at a point between the ends of the cylinder, and a valve in said by-pass pipe.

8. A construction containing the elements in combination defined in claim 7, combined with manually operable means for selecting the axis about which the body shall tilt, and means for opening or closing the valve automatically on operation of said selecting means, opening the same when the body is to be tilted about either of the axes located at one side and parallel to the length of the frame.

9. In combination, a truck frame, a body located above the frame, a shaft mounted transversely and at the rear end of the body, a U-shaped socket opened at its upper side at each end of the shaft, other sockets, one at each side of the frame attached to said frame adjacent the front end of the body, bearing pins connected with said body and seated in said sockets, latching means carried one on each socket and adapted in one position to lock the pins in said sockets, means for operating said latching means to unlock certain of said pins and hold others in locked position whereby a selection of the axis about which the body shall tilt may be made, a cylinder carried by said frame, a piston in the cylinder, a piston rod extending from the piston through the rear end of the cylinder, means at the rear end of the piston rod, and means carried by the frame and interposed between it and the body acted upon by said means on the piston rod for tilting the body about a selected axis on rearward movement of the piston, a pipe connected with the front end of the cylinder through which liquid may be pumped, a return pipe connected with the rear end of the cylinder through which liquid is returned to the pump, a by-pass pipe connecting the cylinder between its end with said return pipe, a valve in the by-pass pipe, and means for automatically maintaining the valve in closed position when a tilting of the body about the rear horizontal axis is selected, and for opening said valve when a tilting of the body about the axes of the pins at either side of the body is selected.

10. In combination, a vehicle frame, a body mounted thereon for tilting movements about an axis located adjacent the rear end transverse of said frame and for other tilting movements about two axes, one located at each side of the frame and parallel to the length thereof, means for selecting the axis about which the body shall be tilted, hydraulic means for tilting the body about any axis selected, and means actuated by said axis selecting means for automatically varying the extent of operation of said hydraulic means in accordance with the selected axis about which the body is to be tilted.

11. In combination, a vehicle frame, a body mounted thereon for tilting movements about an axis adjacent the rear end transverse of said frame and for other tilting movements about either of two axes, one located at each side of the frame and parallel to the length thereof, means for selecting the axis about which the body shall be tilted, a cylinder, a piston in said cylinder, means actuated by movement of the piston in the cylinder to tilt the body, means for forcing liquid into the cylinder at one end, a pipe for returning liquid from the opposite end of the cylinder, a bypass pipe communicating with said return pipe and with said cylinder at a point between the ends of the cylinder, a valve in said bypass pipe and means for opening and closing said valve.

12. In combination, a vehicle frame, a body mounted thereon for tilting movements about an axis adjacent the rear end transverse of said frame and for other tilting movements about either of two axes, one located at each side of the frame and parallel to the length thereof, means for selecting the axis about which the body shall be tilted, a cylinder, a piston in said cylinder, means actuated by movement of the piston in the cylinder to tilt the body, means for forcing liquid into the cylinder at one end, a pipe for returning liquid from the opposite end of the cylinder, a bypass pipe communicating with said return pipe and with said cyllinder at a point between the ends of the cylinder, a valve in said bypass pipe and means actuated by said axis selecting means for opening or closing said valve.

13. In combination, a vehicle frame, a body mounted thereon for tilting movements about an axis adjacent the rear end transverse of said frame and for other tilting movements about either of two axes, one located at each side of the frame and parallel to the length thereof, means for selecting the axis about which the body shall be tilted, a cylinder, a piston in said cylinder, means actuated by movement of the piston in the cylinder to tilt the body, means for forcing liquid into the cylinder at one end, a pipe for returning liquid from the opposite end of the cylinder, a bypass pipe communicating with said return pipe and with said cylinder at a point between the ends of the cylinder, a valve in said bypass pipe and means actuated by said axis selecting means for opening said valve when the body is to be tilted on either of its longitudinal axes and for closing said valve when the body is to be tilted on its transverse axis.

In testimony whereof I affix my signature.

LOGAN T. WOOD.